United States Patent Office 3,198,809
Patented Aug. 3, 1965

3,198,809
MICROBIOLOGICAL REDUCTION PROCESS AND STEROID PRODUCTS PRODUCED THEREBY
Eldon D. Nielson, Winston-Salem, N.C., Pat B. Hamilton, Ponca City, Okla., and Moises Riano and David Rosi, East Greenbush, and George P. Peruzzotti, North Greenbush, N.Y., assignors to Sterling Drug Inc., New York, N.Y., a corporation of Delaware
No Drawing. Filed Nov. 7, 1963, Ser. No. 322,029
36 Claims. (Cl. 260—343.2)

This invention relates to a new microbiological reduction process in the steroid field and to novel products produced thereby.

More particularly, the invention resides in the concept of a process for producing a 2-hydroxymethyl steroid from a 2-hydroxymethylene steroid which comprises subjecting the latter to the fermentative enzymatic action of a micro organism capable of effecting the reduction of the exocyclic double bond at the 2-position.

The process is applicable to a steroid having a hydroxymethylene group in the 2-position. The hydroxymethyl group produced by the microbiological reduction assumes the stable or equatorial configuration which is the α-configuration in the event the steroid belongs to the 5α (androstane) series or has a 4,5-double bond; or the β-configuration in the event the steroid belongs to the 5β (etiocholane) series. A preferred class of steroids is that wherein the steroid has a 3-oxo group and a double bond in the 4,5-position, the process being illustrated by the following equation:

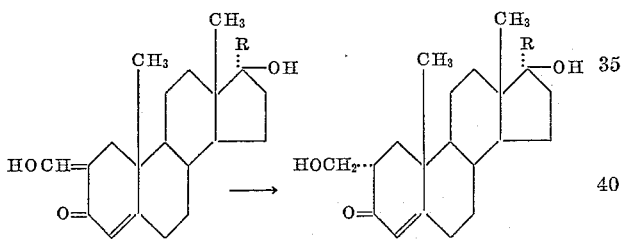

The course of the reduction can be followed by the ultraviolet spectrum in which a shift in the maximum absorption from 252 m$\mu$ to about 240 m$\mu$ occurs.

A wide variety of microorganisms has been found effective to bring about the above reduction. These microorganisms belong to the orders Actinomycetales, Moniliales, Mucorales, Sphaeriales and Spirogyrales. We have found variations exist in the efficiency of different genera and species of organisms within the above orders in our reduction process and have therefore ascertained that, by following the screening procedure hereinafter described, the effectiveness of any particular organism can readily be determined.

Some microorganisms have been found to produce other transformations of the steroid molecule along with the reduction of the 2-hydroxymethylene group. For example, a culture medium containing *Aspergillus flavipes* converts 2 - hydroxymethylene-4-androsten-17β-ol-3-one first to 2α-hydroxymethyl-4-androsten-17β-ol-3-one and then oxidizes it to 2α-hydroxymethyltestololactone. The organism *Penicilium lilacinum*, however, only carries out the initial reduction step. These transformations are illustrated in the following flow sheet:

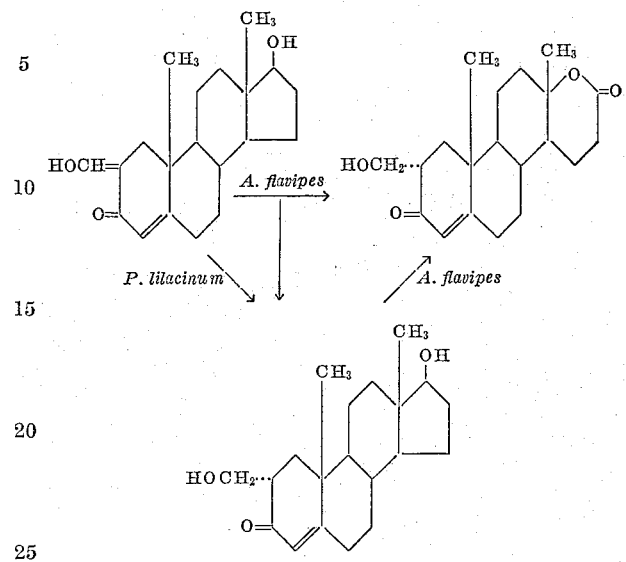

Occasionally hydroxylation or oxidation reactions will occur simultaneously with or subsequent to the reduction of the 2-hydroxymethylene group. For example microbial conversion of 2-hydroxymethylene-4-androsten-17β-ol-3-one with *Streptomyces roseochromogenus* led to the isolation of 2α-hydroxymethyl - 4 - androstene - 3,17-dione and 2α - hydroxymethyl - 4 - androsten - 16 - ol - 3, 17-dione.

The novel products of the invention include those of the following formula

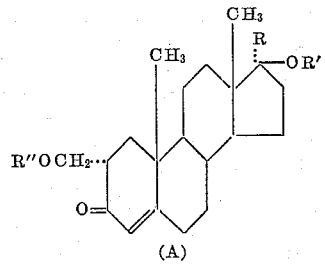

(A)

wherein R is hydrogen, lower-alkyl or lower alkynyl, and R' and R" are either hydrogen or lower-alkanoyl groups. The compounds wherein R' and R" are hydrogen are prepared by the microbiological reduction process described above, that is, from the corresponding 2-hydroxymethylene derivatives. The compounds where one or both of R' and R" are lower-alkanoyl groups are prepared by conventional esterification reactions, as by reacting the free carbinols with the appropriate acid halide or acid anhydride.

The compounds of the foregoing Formula A and the other 2-hydroxymethyl steroids produced by the process of the invention are useful as intermediates, and themselves exhibit endocrino-logical activities, for example, pituitary-inhibiting activity. Upon treatment with basic reagents, for example, potassium bicarbonate in methanol, the elements of water (or of lower-alkanoic acid if R" is lower-alkanoyl) are split out from the 2-hydroxymethyl (or 2-acyloxymethyl) group to give a 2-methylene-3-oxo- 4-androstene compound. The latter are useful as anabolic agents.

The structures of the products obtained by the process of the invention were established by elementary analysis and by evidence provided by ultraviolet, infrared and NMR spectra.

GENERAL SCREENING PROCEDURE TO DETERMINE EFFICIENCY OF ANY SPECIFIC ORGANISM

Inoculate the microorganism onto agar slants or other agar base media suitable for growth. Place the inoculated slants in an incubator at approximately 26° C. and allow to grow for one week. Remove the slants and add 15 ml. of distilled water. Loosen the spores and vegetative growth from the agar with a sterile needle. Transfer the suspension to a flask containing 100 ml. of the soy-dextrose medium described below, and place the flask on a rotary shaker in an incubator at approximately 26° C. at about 210 r.p.m. for twenty-four hours. After this initial time period (first stage seed), add 10 ml. of the submerged growth under sterile conditions to each of duplicate flasks of different types of media, namely, soy-dextrose, glucose-Edamine and dextrin-cornsteep (for compositions, see below). Place the flasks on the shaker and allow to grow for forty-eight to seventy-two hours at approximately 26° C. Add the substrate (steroid) in a suitable water-miscible solvent, for example, acetone, methanol, or dimethylformamide to one flask of each pair. The amount of steroid added to the fermentation may vary considerably, but it is generally on the order of 0.1 to 0.5 g. per liter of medium (10 to 50 mg. per flask). The other flask of each pair serves as the control.

Allow the fermentation to proceed for a period of time long enough to achieve maximum conversion of the steroid substrate (sixteen to seventy-two hours) and remove the flasks from the shaker.

After completion of the fermentation, extract the whole mash with a water-immiscible solvent; or, alternatively, separate the mycelium by filtration and extract it, for example, with acetone or methylene dichloride or both, evaporate the extracts and add the residue to the culture filtrate. Extract the latter twice with an equal volume of a water-immiscible organic solvent, for example, ethylacetate or methylene dichloride. Wash the combined solvent-extracts with diluted sodium bicarbonate solution followed by water, dry with anhydrous sodium sulfate, and finally evaporate to remove the volatile solvent.

The nature of the materials produced can be detected by paper and thin layer chromatographic procedures and analyzed by ultraviolet spectrophotometry. In larger scale fermentations, the products are isolated directly by fractional crystallization from a suitable solvent or by column chromatography on conventional adsorbents, such as activated magnesium silicate, silica gel or alumina.

Constitution of illustrative media used:

Soy-dextrose—
 Soybean meal _____ g__ 5
 Dextrose _____ g__ 20
 NaCl _____ g__ 5
 $K_2HPO_4$ _____ g__ 5
 Yeast _____ g__ 5
 Tap water _____ l__ 1
 pH to 6.4.
 Autoclave at 15 lbs. per sq. in. for 15 min.
Cerelose-Edamine—
 Cerelose (crude dextrose) _____ g__ 50
 Edamine [1] _____ g__ 20
 Cornsteep liquor _____ ml__ 5
 Tap water _____ l__ 1
 pH to 4.5.
 Autoclave at 15 lbs. per sq. in. for 15 min.

[1] An enzymatic hydrolysate of milk protein (Sheffield Farms Co.).

Dextrin-cornsteep—
 Dextrin _____ g__ 10
 Cornsteep liquor _____ g__ 80
 $KH_2PO_4$ _____ g__ 1
 NaCl _____ g__ 5
 Tap water _____ l__ 1
 pH to 4.0.
 Autoclave at 15 lbs. per sq. in. for 30 min.

The above nutrient media suitable for growth of the microorganisms are illustrative and not limiting.

The above general procedure is given as a typical example only. While it is used in the examples below, it may be varied if desirable or necessary. For example, other media, incubation period, temperature, etc. may be used. These methods are well known to those skilled in the art.

EXAMPLE 1

*Transformation of 2-hydroxymethylene-4-androsten-17β-ol-3-one in a culture medium containing* Aspergillus flavipes Two fourteen liter jar fermentors were prepared, each containing 10 liters of sterile medium of the following composition:

| | Percent |
|---|---|
| Cerelose (glucose) | 5 |
| Edamine | 2 |
| Cornsteep liquor | 0.5 |
| Tap water (pH adjusted to 4.5 with 10 N-Hcl prior to autoclaving). | |

The fermentors were inoculated with an *A. flavipes* seed which was produced by growing the culture in a medium contained in 100 ml. quantities in 500 ml. Erlenmeyer flasks. The cultures were aerated on a shaker rotating at 210 r.p.m. They were incubated at 26° C. for seventy-two hours and 10% quantities of inocula were used to seed the fermentors. The inoculated fermentors were agitated at 400 r.p.m. and aerated with 2 liters of air per minute at a temperature of 25° C. for forty-eight hours at which time 4 g. of 2-hydroxymethylene-4-androsten-17β-ol-3-one dissolved in 75 ml. of N,N-dimethylformamide was added to each tank. Antifoam was added as needed during the fermentation cycle.

Samples taken periodically from the tanks were analyzed chromatographically, indicating that the fermentations were proceeding as expected; that is, a polar metabolite, 2α-hydroxymethyl-4-androsten-17β-ol-3-one, was observed in the first few hours. Samples analyzed at a later period indicated that a second even more polar component, 2α-hydroxymethyltestololactone, was also being formed. Twenty-four hours after addition of the substrate, chromatography indicated that the substrate added to the fermentation and the less polar metabolite (2α-hydroxymethyl - 4 - androstan - 17β - ol - 3 - one) had disappeared. The fermentation was terminated and the mycelium was filtered off. The mycelial cake was washed with two one-liter volumes of acetone, and the combined filtrate and washings were extracted once with 20 liters of methylene dichloride and twice with half-volumes. These extracts were combined and concentrated to about 500 ml., washed several times with 250 ml. portions of 2% aqueous sodium bicarbonate, then washed twice with 250 ml. portions of water, dried with anhydrous sodium sulfate and evaporated to dryness. The residue was triturated three times with 25 ml. portions of ether to remove some oils. Crystallization of the remaining residue from methyl alcohol, with the aid of decolorizing carbon, gave colorless crystals (0.503 g.) of 2α-hydroxymethyl-testololactone, M.P. 217.8–223.8° C. (dec.) (corr.), $[\alpha]_D^{25} = +57.2°$ (1% $CHCl_3$); ultraviolet maximum at 239–240 mμ (ε=16,600), infrared adsorption at 2.96, 5.82, 6.04 and 6.19μ. The NMR spectrum was in accordance with the assigned structure.

PREPARATION OF 2α-ACETOXYMETHYL-TESTOLOLACTONE 1.0 g. of 2α-hydroxymethyltestololactone was dissolved in 10 ml. of pyridine and 12.5 ml. of acetic anhydride was added. The reaction mixture was maintained at room temperature (25° C.) for approximately sixteen hours. After the reaction was complete, ice-water was added to precipitate the crude product (0.9134 g.). Recrystallization from ethyl acetate yielded 2α-acetoxymethyltestololactone (0.650 g.), M.P. 169.0–171.0° C. (corr.), $[\alpha]_D^{25} = +29°$ (1% $CHCl_3$); ultraviolet maximum at 239 m$\mu$ ($\epsilon$=16,600); infrared absorption at 3.88, 5.75, 5.96, 6.16 and 8.01$\mu$.

EXAMPLE 2

Transformation of 2-hydroxymethylene-4-androsten-17β-ol-3-one in a culture medium containing Penicillium lilacinum 2-hydroxymethylene-4-androsten-17β-ol-3-one (4.0 g.) was subjected to the action of the enzymes produced by Penicillium lilacinum. Two 14 liter tanks were fermented and extracted as previously described above for A. flavipes (Example 1). The dichloromethane extracts of the fermentation beer were evaporated under reduced pressure to approximately 500 ml. and washed with aqueous sodium bicarbonate, then with water, dried over anhydrous sodium sulfate and evaporated to remove the volatile solvent as described in Example 1. After removal of extraneous oils by washing the residue with n-hexane, the remaining amorphous material was chromatographed over activated magnesium silicate using ethylene dichloride-acetone mixtures as eluants. The fractions eluted with 8:1 and 10:1 mixtures were evaporated to dryness. The residue was recrystallized from ethyl acetate to give 1.62 g. of 2α-hydroxymethyl-4-androsten-17β-ol-3-one, M.P. 199.8–203.4° C. (corr.) $[\alpha]_D^{25} = +130°$ (1% $CHCl_3$); ultraviolet maximum at 242 m$\mu$ ($\epsilon$=15,300); infrared absorption at 2.96, 3.44, 3.50, 3.54, 6.01, 6.20 and 6.90$\mu$.

Acetylation of 2α-hydroxymethyl-4-androsten-17β-ol-3-one with acetic anhydride in pyridine gave 2α-acetoxymethyl-17β-acetoxy-4-androsten-3-one, M.P. 109.6–118.8° C. (corr.) when recrystallized from methanol-water; $[\alpha]_D^{25} = +5.5°$ (1% $CHCl_3$); ultraviolet maximum at 241 m$\mu$ ($\epsilon$=16,132); infrared absorption at 5.78, 5.99, 6.18 and 8.08$\mu$.

When 2α-hydroxymethyl-4-androsten-17β-ol-3-one was subjected to the action of a fermentation medium of Aspergillus flavipes, it was converted in 60% yield to 2α-hydroxymethyl-testololactone, identical with the product obtained above in Example 1.

In the following table are listed organisms which have been found to bring about the reduction of 2-hydroxymethylene-4-androsten-17β-ol-3-one to 2α-hydroxymethyl-4-androsten-17β-ol-3-one. In some instances additional products are also formed.

TABLE

Order (Moniliales):

| | |
|---|---|
| Alternaria porri (Ell.) Sacc. | CBS |
| Alternaria consortiale (Thöm) Groves and Hughes | CBS |
| Aspergillus alliaceus | ATCC 10060 |
| Aspergillus amstelodami | ATCC 10065 |
| Aspergillus asperescens | ATCC 11079 |
| Aspergillus clavatus | ATCC 9192 |
| Aspergillus flavipes | ATCC 11013 |
| Aspergillus flavipes | ATCC 1030 |
| Aspergillus itaconicus | ATCC 10021 |
| Aspergillus malignus | CMI 16061 |
| Aspergillus nidulans | ATCC 11267 |
| Aspergillus niger | ATCC 11394 |
| Aspergillus oryzae | ATCC 9362 |
| Aspergillus ustus | ATCC 10032 |
| Beauveria densa | ATCC 9452 |

Order (Moniliales):—Continued

| | |
|---|---|
| Botrytis cinerea | ATCC 12481 |
| Botrytis paeoniae | ATCC 12482 |
| Cephalosporium gregatum | ATCC 11073 |
| Helminthosporium victoriae | ATCC 12566 |
| Penicillium aculeatum | ATCC 10409 |
| Penicillium adametzi | NRRL 737 |
| Penicillium albidum | ATCC 10408 |
| Penicillium avellaneum | ATCC 10414 |
| Penicillium chermesinum | ATCC 10424 |
| Penicillium citrinum | ATCC 10105 |
| Penicillium coryliophilum | ATCC 9784 |
| Penicillium griseofulvum | ATCC 11855 |
| Penicillium lilacinum | ATCC 10114 |
| Penicillium lividum | ATCC 10102 |
| Penicillium nigricans | ATCC 10115 |
| Penicillium tardum | ATCC 10503 |
| Penicillium sps. | ATCC 12556 |
| Pleospora herbarum (Pers.) | CBS |

Order (Mucorales):

| | |
|---|---|
| Chaetocladium jonesii | CMI 40066 |
| Choanephora cucurbitarum | ATCC 10909 |
| Cunninghamella elegans | ATCC 10028a(+) |
| Cunninghamella verticillata | ATCC 8983 |
| Helicostylum piriforme | ATCC 8992 |
| Linderina pennispora | ATCC 12442 |
| Mucor griseo-cyanus | ATCC 1207a(+) |
| Mucor mucedo | ATCC 7941 |
| Mucor racemosus | ATCC 1216a(+) |
| Rhizopus arrhizus | ATCC 11145 |
| Rhizopus chinensis | ATCC 1227b(+) |
| Rhizopus cohnii | ATCC 8996 |
| Rhizopus stolonifer | ATCC 12939b(−) |

Order (Sphaeriales):

| | |
|---|---|
| Chaetomium cochliodes | ATCC 10195 |
| Chaetomium cristatum | ATCC 11201 |
| Didymella lycopersici | ATCC 11847 |
| Emericellopsis salmosynnemata | ATCC 11661 |

Order (Spirogyrales):

| | |
|---|---|
| Syncephalolastrum racemosum | ATCC 1332b(−) |

CBS indicates the organism was obtained from the Centraal Bureau voor Schimmelcultures, Netherlands.
ATCC=American Type Culture Collection number.
CMI=Commonwealth Mycological Institute number.
NRRL=Northern Regional Research Laboratory number.

EXAMPLE 3

Transformation of 2-hydroxymethylene-17α-methyl-4-androsten-17β-ol-3-one in a culture medium containing Penicillium lilacinum A fermentation vessel having a capacity of 14 liters provided with stirring means, an air inlet tube and sampling outlet tubes, was charged with 10 liters of a nutrient solution of the following composition:

| | Percent |
|---|---|
| Cerelose | 5 |
| Edamine | 2 |
| Cornsteep liquor | 0.5 |

Tap water (pH adjusted to 4.5 with 10 N-HCl).

Antifoam Silicone oil (10 ml.) was added and the solution was sterilized for forty-five minutes at 15 lbs. pressure, and after being cooled it was inoculated through the inoculation port with a 10%, seventy-two hours-old vegetative growth of Penicillium lilacinum (ATCC 10114) grown in 100 ml. of sterile medium contained in 500 ml. Erlenmeyer flasks incubated at 26° C. and aerated on a shaker rotating at 210 r.p.m. After growing the culture for forty-eight hours at 31° C. with a supply of 2 liters of air per minute, and agitated at 400 r.p.m., 5 g. of 2-hydroxymethylene-17α-methyl-4-androsten-17β-ol-3-one dissolved in 70 ml. of N,N'-dimethylformamide was added to the tank. Additional amounts of antifoam were added as needed during the course of the fermentation. Samples taken periodically from the tank were extracted and assayed by paper chromatographic procedures. The fermentation appeared to be complete twenty-two hours after addition of the substrate. It was discontinued and the whole mash was acidified to pH 2.0 and extracted twice with 20 liter portions of dichloromethane. The combined extracts were concentrated under reduced pressure to about two liters, washed with two 500 ml. portions of 2% aqueous sodium bicarbonate and then with water. The resulting solution was dried over sodium sulfate and concentrated to remove the volatile solvent. Ether washings of the residue yielded a crude material (44% yield of the weight of the fermentation substrate) melting at 194–198° C. which was chromatographed over activated magnesium silicate using ethylene dichloride: acetone mixture as eluants. The fractions eluted with 10:1 mixtures were evaporated to dryness yielding a compound which was crystallized from ethyl acetate as hexagonal plates to give 2α-hydroxymethyl-17α-methyl-4-androsten-17β-ol-3-one, M.P. 210.0–210.8° C. (corr.), $[\alpha]_D^{25}=+94.9°$ (0.519% in chloroform); ultraviolet maximum at 241 mμ ($\epsilon=15,466$); infrared absorption at 2.92, 6.05 and 6.20μ.

Acetylation of 2α-hydroxymethyl-17α-methyl-4-androsten-17β-ol-3-one with acetic anhydride in pyridine gave 2α-acetoxymethyl-17α-methyl-4-androsten-17β-ol-3-one, M.P. 136.8–138.6° C. (corr.), when recrystallized from ether; $[\alpha]_D^{25}=+88.5°$ (0.504% in chloroform); ultraviolet maximum at 242 mμ ($\epsilon=12,152$); infrared absorption at 2.86, 5.75, 5.99 and 6.19μ.

EXAMPLE 4

Transformation of 2-hydroxymethylene-17α-ethynyl-4-androsten-17β-ol-3-one in a culture medium containing *Rhizopus stolonifer* was carried out by the procedure described hereinabove in Examples 1–3. There was thus obtained 2α-hydroxymethyl-17α-ethynyl-4-androsten-17β-ol-3-one, M.P. 164–165° C. (uncorr.) (recrystallized from ethyl acetate), $[\alpha]_D^{25}=+38.8°$ (.93% CHCl₃); ultraviolet maximum at 242 mμ ($\epsilon=14,400$); infrared absorption at 2.95, 3.06, 4.75, 6.07 and 6.19μ. The NMR spectrum was in accordance with the assigned structure.

Following the foregoing procedures, 2-hydroxymethyleneetiocholan-17β-ol-3-one,
2-hydroxymethylenepregnane-3,20-dione,
2-hydroxymethylene-17α-methyl-19-norandrostan-17β-ol-3-one,
2-hydroxymethylene-6α,17α-dimethylandrostan-17β-ol-3-one,
20-ethylenedioxy-2-hydroxymethylene-4-pregnen-21-ol-3-one,
20-ethylenedioxy-2-hydroxymethylene-4,4-dimethyl-5-pregnen-3-one,
2-hydroxymethylene-4,17α-dimethyl-4-androsten-17β-ol-3-one, or
2-hydroxymethylene-4-cholesten-3-one can be converted, respectively, to 2β-hydroxymethyletiocholan-17β-ol-3-one,
2β-hydroxymethylpregnane-3,20-dione,
2α-hydroxymethyl-17α-methyl-19-norandrostan-17β-ol-3-one,
2α-hydroxymethyl-6α,17β-dimethylandrostan-17β-ol-3-one,
20-ethylenedioxy-2α-hydroxymethyl-4-pregnen-21-ol-3-one,
20-ethylenedioxy-2α-hydroxymethyl-4,4-dimethyl-5-pregnen-3-one,
2α-hydroxymethyl-4,17α-dimethyl-4-androsten-17β-ol-3-one, or
2α-hydroxymethyl-4-cholesten-3-one.

There are some organisms which bring about reduction of the steroidal 2-hydroxymethylene group to a 2-hydroxymethyl group while subsequently causing other transformations of the steroid molecule. These organisms include *Streptomyces roseochromogenus* ATCC 13400 (order Actinomycetales), *Cunninghamella elegans* ATCC 10028a (order Mucorales) and *Cunninghamella verticillata* ATCC 8983 (order Mucorales).

EXAMPLE 5

Transformation of 2-hydroxymethylene-4-androsten-17β-ol-3-one in a culture medium containing *Streptomyces roseochromogenus* was carried out by the procedures described hereinabove in Examples 1–3. By chromatographic separation of the product mixture there was obtained 2α-hydroxymethyl-4-androstene-3,17-dione, M.P. 172.0–174.2° C. (corr.) (recrystallized from ethyl acetate), $[\alpha]_D^{25}=+212.3°$ (1% CHCl₃); ultraviolet maximum at 241 mμ ($\epsilon=15,400$); infrared absorption at 2.86, 3.42, 5.78, 6.02 and 6.87μ; and 2α-hydroxymethyl-4-androsten-16α-ol-3,17-dione, M.P. 203.0–205.0° C. (corr.) (recrystallized from ethyl acetate), $[\alpha]_D^{25}=+206.1°$ (0.507% in chloroform); ultraviolet maximum at 240 mμ ($\epsilon=15,300$); infrared absorption at 2.93, 2.99, 3.46, 5.80, 6.04 and 6.20μ. The latter two products were acetylated with acetic anhydride in pyridine to give, respectively, 2α-acetoxymethyl-4-androstene-3,17-dione, M.P. 165.4–168.0° C. (corr.) (recrystallized from n-hexane-ethyl acetate), $[\alpha]_D^{25}=+151.1°$ (1% CHCl₃); ultraviolet maximum at 240 mμ ($\epsilon=15,900$); infrared absorption at 3.43, 3.50, 5.77, 5.97, 6.17, 8.09 and 8.22μ; and 2α-acetoxymethyl-16α-acetoxy-4-androstene-3,17-dione, M.P. 157.6–159.4° C. (corr.) (recrystallized from n-hexane-ethyl acetate), $[\alpha]_D^{25}=+103.9°$ (1% CHCl₃); ultraviolet maximum at 240 mμ ($\epsilon=15,800$); infrared absorption at 5.69, 5.79, 6.00 and 6.20μ. The NMR spectra of the foregoing products were in accordance with the assigned structures.

EXAMPLE 6

2α-hydroxymethyl-17α-methyl-4-androstene-16α,17β-diol-3-one was prepared from 2-hydroxymethylene-17α-methyl-4-androsten-17β-ol-3-one in a fermentation medium containing *Streptomyces roseochromogenus* as described hereinabove in Examples 1–3. Purification by chromatography afforded 2α-hydroxymethyl-17α-methyl-4-androstene-16α,17β-diol-3-one, M.P. 226–228.5° C. (corr.); $[\alpha]_D^{25}=+70.0°$ (0.2% in chloroform); ultraviolet maximum at 241 mμ ($\epsilon=15,200$); infrared absorption at 2.96, 3.40, 3.50, 6.03, 6.10 and 6.21μ.

2α-hydroxymethyl-17α-methyl-4-androstene-16α,17β-diol-3-one can be caused to react with acetic anhydride in pyridine to give 2α-acetoxymethyl-17α-methyl-4-androstene-16α,17β-diol-3-one 16-acetate.

EXAMPLE 7

2α-hydroxymethyl-4-androstene-6β,17β-diol-3-one was prepared by fermenting 2-hydroxymethylene-4-androsten-17β-ol-3-one in sterile cerelose-Edamine medium as described hereinabove in Examples 1–3 with *Cunninghamella elegans* ATCC 10028a(+) or *Cunninghamella verticillata* ATCC 8983. Purification of the fermentation products by chromatography afforded 2α-hydroxy-methyl-4-androstene-6β,17β-diol-3-one, M.P. 213–215.5° C. (corr.), $[\alpha]_D^{25}=+1.1°$ (0.2% CHCl₃); ultraviolet maximum at 239 mμ ($\epsilon=12,700$); infrared absorption at 2.97, 3.43, 3.50, 6.03 and 6.19μ. Acetylation of 2α-hydroxymethyl-4-androstene-6β,17β-diol-3-one with acetic anhydride in pyridine gave 2α-acetoxymethyl-androst-4-ene-6β,17β-diol-3-one 6,17-diacetate when recrystallized from n-hexane, M.P. 163.6–165.0° C. (corr.), $[\alpha]_D^{25}=+21.1°$ (1% in chloroform); ultraviolet maximum at 237 mμ ($\epsilon=13,100$); infrared absorption at 5.75, 6.01, 6.18 and 8.00μ.

EXAMPLE 8

6β,17β-dihydroxy-2-hydroxymethyl-17α-ethynyl-4-androsten-3-one was prepared by submitting 2-hydroxymethylene-17α-ethynyl-4-androsten-17β-ol-3-one in a sterile cerelose-Edamine medium to the enzymatic action of Cunninghamella elegans ATCC 10028a(+). Purification of the fermentation products by chromatography afforded 6β,17β-dihydroxy-2-hydroxymethyl-17α-ethynyl-4-androsten-3-one, M.P. 200–201° C. (uncorr.) (recrystallized from ethyl acetate); $[\alpha]_D^{25} = -14.5°$ (0.131% in chloroform); ultraviolet maximum at 239 mμ ($\epsilon$=12,700); infrared absorption at 3.00, 3.44, 3.52, 4.77, 6.04 and 6.20μ. Acetylation of 6β,17β-dihydroxy-2-hydroxy methyl-17α-ethynyl-4-androsten-3-one with acetic anhydride in pyridine gave 6β,17β-dihydroxy-2-acetoxymethyl-17α-ethynyl-4-androsten-3-one 6 - acetate, M.P. 80–90° C. (uncorr.) (recrystallized from n-hexane-ethyl acetate); $[\alpha]_D^{25} = -21.0°$ (0.40% in chloroform); ultraviolet maximum at 236 mμ ($\epsilon$=12,750); infrared absorption at 2.90, 3.07, 3.42, 3.50, 5.75, 5.97, 6.16, 6.88 and 8.10μ. The NMR spectrum was in accordance with the proposed structure.

EXAMPLE 9

6β,17β - dihydroxy - 2 - hydroxymethyl-17α-methyl-4-androsten-3-one was prepared from 2-hydroxymethylene-17α-methyl-4-androsten-17β-ol-3-one by the enzymatic action of Cunninghamella elegans ATCC 10028a(+). Purification by chromatography afforded 6β,17β-dihydroxy-2-hydroxymethyl-17α-methyl-4-androsten - 3 - one, M.P. 255–258° C. (uncorr.) (recrystallized from ethyl acetate); $[\alpha]_D^{25} = +52.4°$ (0.75% in pyridine); ultraviolet maximum at 239 mμ ($\epsilon$=12,900); infrared absorption at 3.00, 3.44, 5.98, 6.10 and 6.20μ.

We claim:

1. The process for producing a 2-hydroxymethyl steroid which comprises subjecting a 2-hydroxymethylene steroid to the reductive fermentative enzymatic action of a microorganism of an order selected from the group consisting of Actinomycetales, Moniliales, Mucorales, Sphaeriales and Spirogyrales.

2. The process according to claim 1 in which the steroid has an oxo group in the 3-position and a double bond in the 4,5-position.

3. The process for preparing a compound of the formula

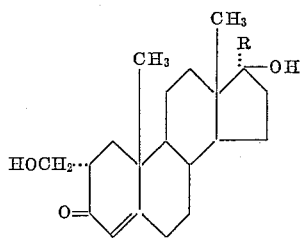

which comprises subjecting a compound of the formula

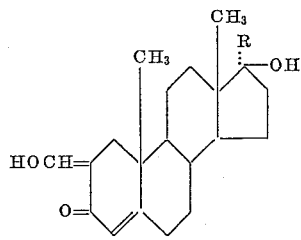

wherein R is a member of the group consisting of hydrogen, lower-alkyl and lower-alkynyl, to the reductive fermentative enzymatic action of a microorganism of an order selected from the group consisting of Actinomycetales, Moniliales, Mucorales, Sphaeriales and Spirogyrales.

4. The process for preparing 2α-hydroxymethyl-4-androsten-17β-ol-3-one which comprises subjecting 2-hydroxymethylene-4-androsten-17β-ol-3-one to the reductive fermentative enzymatic action of a microorganism of the genus Aspergillus.

5. The process for preparing 2α-hydroxymethyl-4-androsten-17β-ol-3-one which comprises subjecting 2-hydroxymethylene-4-androsten-17β-ol-3-one to the reductive fermentative enzymatic action of a microorganism of the genus Penicillium.

6. The process for preparing 2α-hydroxymethyl-4-androsten-17β-ol-3-one which comprises subjecting 2-hydroxymethylene-4-androsten-17β-ol-3-one to the reductive fermentative enzymatic action of the microorganism Aspergillus flavipes.

7. The process for preparing 2α-hydroxymethyl-4-androsten-17β-ol-3-one which comprises subjecting 2-hydroxymethylene-4-androsten-17β-ol-3-one to the reductive fermentative enzymatic action of the microorganism Penicillium lilacinum.

8. The process for preparing 2α-hydroxymethyl-17α-methyl-4-androsten-17β-ol-3-one which comprises subjecting 2-hydroxymethylene-17α-methyl-4-androsten-17β-ol-3-one to the reductive fermentative enzymatic action of a microorganism of the genus Aspergillus.

9. The process for preparing 2α-hydroxymethyl-17α-methyl-4-androsten-17β-ol-3-one which comprises subjecting 2-hydroxymethylene-17α-methyl-4-androsten-17β-ol-3-one to the reductive fermentative enzymatic action of a microorganism of the genus Penicillium.

10. The process for preparing 2α-hydroxymethyl-17α-methyl-4-androsten-17β-ol-3-one which comprises subjecting 2-hydroxymethylene-17α-methyl-4-androsten-17β-ol-3-one to the reductive fermentative enzymatic action of the microorganism Aspergillus flavipes.

11. The process for preparing 2α-hydroxymethyl-17α-methyl-4-androsten-17β-ol-3-one which comprises subjecting 2-hydroxymethylene-17α-methyl-4-androsten-17β-ol-3-one to the reductive fermentative enzymatic action of the microorganism Penicillium lilacinum.

12. The process for preparing 2α-hydroxymethyl-17α-ethynyl-4-androsten-17β-ol-3-one which comprises subjecting 2-hydroxymethylene-17α-ethynyl-4-androsten-17β-ol-3-one to the reductive fermentative enzymatic action of a microorganism of the genus Rhizopus.

13. The process for preparing 2α-hydroxymethyl-17α-ethynyl-4-androsten-17β-ol-3-one which comprises subjecting 2-hydroxymethylene-17α-ethynyl-4-androsten - 17β-ol-3-one to the reductive fermentative enzymatic action of the microorganism Rhizopus stolonifer.

14. A compound of the formula

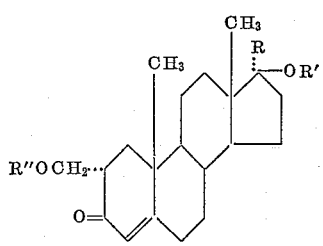

wherein R is a member of the group consisting of hydrogen, lower-alkyl and lower-alkynyl; and R' and R" are members of the group consisting of hydrogen and lower-alkanoyl.

15. 2α-hydroxymethyl-4-androsten-17β-ol-3-one.

16. 2α-acetoxymethyl-17β-acetoxy-4-androsten-3-one.

17. 2α-hydroxymethyl-17α-methyl-4 - androsten-17β-ol-3-one.

18. 2α-acetoxymethyl-17α-methyl-4-androsten-17β-ol-3-one.

19. 2α-hydroxymethyl-17α-ethynyl-4 -androsten-17β-ol-3-one.

20. A member of the group consisting of 2α-hydroxymethyltestololactone and lower-alkanoyl esters thereof.

21. 2α-hydroxymethyltestololactone.

22. 2α-acetoxymethyltestololactone.

23. A member of the group consisting of 2α-hydroxymethyl-4-androstene-3,17-dione and lower-alkanoyl esters thereof.

24. 2α-hydroxymethyl-4-androstene-3,17-dione.

25. 2α-acetoxymethyl-4-androstene-3,17-dione.

26. A member of the group consisting of 2α-hydroxymethyl-4-androsten-16α-ol-3,17-dione and lower-alkanoyl ester thereof.

27. 2α-hydroxymethyl-4-androsten-16α-ol-3,17-dione.

28. 2α-acetoxymethyl-4-androsten-16α-ol-3,17-dione 16-acetate.

29. A member of the group consisting of 2α-hydroxymethyl-17α-methyl-4-androstene-16α,17β-diol-3-one and lower-alkanoyl esters thereof.

30. 2α-hydroxymethyl-17α-methyl-4-androstene-16α,17β-diol-3-one.

31. A member of the group consisting of (A) 2α-hydroxymethyl-17α-R-4-androstene-6β,17β-diol-3-one, wherein R is a member of the group consisting of hydrogen, lower-alkyl and lower-alkynyl; and (B) lower-alkanoyl esters thereof.

32. 2α-hydroxymethyl-4-androstene-6β,17β-diol-3-one.

33. 2α-acetoxymethyl-4-androstene-6β,17β-diol-3-one 6,17-diacetate.

34. 6β,17β-dihydroxy-2α-hydroxymethyl-17α-ethynyl-4-androsten-3-one.

35. 6β,17β-dihydroxy-2α-acetoxymethyl-17α-ethynyl-4-androsten-3-one 6-acetate.

36. 6β,17β-dihydroxy-2α-hydroxymethyl-17α-methyl-4-androsten-3-one.

No references cited.

LEWIS GOTTS, *Primary Examiner.*